US011299436B2

(12) United States Patent
Hansen et al.

(10) Patent No.: US 11,299,436 B2
(45) Date of Patent: Apr. 12, 2022

(54) NPK-SI FERTILIZER, METHOD FOR PRODUCTION AND USE THEREOF

(71) Applicant: ELKEM ASA, Oslo (NO)

(72) Inventors: Tor Soyland Hansen, Sogne (NO); Magne Dastol, Kristiansand (NO); Vladimir Matychenkov, Pushchino (RU)

(73) Assignee: ELKEM ASA, Oslo (NO)

( * ) Notice: Subject to any disclaimer, the term of this patent is extended or adjusted under 35 U.S.C. 154(b) by 0 days.

(21) Appl. No.: 16/765,275

(22) PCT Filed: Nov. 20, 2018

(86) PCT No.: PCT/NO2018/050282
§ 371 (c)(1),
(2) Date: May 19, 2020

(87) PCT Pub. No.: WO2019/098853
PCT Pub. Date: May 23, 2019

(65) Prior Publication Data
US 2021/0139386 A1  May 13, 2021

(30) Foreign Application Priority Data
Nov. 20, 2017 (NO) .................. 20171850

(51) Int. Cl.
C05D 9/00 (2006.01)
C05D 9/02 (2006.01)
(Continued)

(52) U.S. Cl.
CPC ............. C05D 9/00 (2013.01); C05B 7/00 (2013.01); C05B 15/00 (2013.01); C05B 17/00 (2013.01);
(Continued)

(58) Field of Classification Search
None
See application file for complete search history.

(56) References Cited

U.S. PATENT DOCUMENTS 3,936,501 A * 2/1976 Greidinger ............... C11D 3/06
564/63
4,707,176 A * 11/1987 Durham .................. A01G 24/25
71/23

(Continued)

FOREIGN PATENT DOCUMENTS

CN     1123262 A     5/1996
CN     1810736 A     8/2006

(Continued)

OTHER PUBLICATIONS

Search Report for Corresponding Russian Patent Application No. 2020120219, dated Oct. 2, 2020, 2 Pages, English translation 2 Pages.

(Continued)

Primary Examiner — Wayne A Langel
(74) Attorney, Agent, or Firm — Lucas & Mercanti, LLP

(57) ABSTRACT

The present application relates to a combined NPK-Si fertilizer product comprising a mineral NPK fertilizer, which comprises at least one nutrient compound of nitrogen, phosphorous or potassium, and a particulate amorphous silicon dioxide, wherein the ratio of the mineral NPK fertilizer to the amorphous silicon dioxide is from 10:90 to 90:10, based on the dry weight of the at least one nutrient compound of nitrogen, phosphorous or potassium, and the amorphous silicon dioxide contained in the product. The application also relates to the method of production of the inventive NPK-Si fertilizer.

24 Claims, 4 Drawing Sheets

(51) Int. Cl.
- *C05B 7/00* (2006.01)
- *C05B 17/00* (2006.01)
- *C05C 1/00* (2006.01)
- *C05C 3/00* (2006.01)
- *C05C 5/02* (2006.01)
- *C05C 9/00* (2006.01)
- *C05D 1/00* (2006.01)
- *C05B 15/00* (2006.01)

(52) U.S. Cl.
CPC ............... *C05C 1/00* (2013.01); *C05C 3/00* (2013.01); *C05C 5/02* (2013.01); *C05C 9/00* (2013.01); *C05D 1/00* (2013.01); *C05D 9/02* (2013.01)

(56) References Cited

U.S. PATENT DOCUMENTS

| | | | | |
|---|---|---|---|---|
| 5,782,951 | A * | 7/1998 | Aylen | C05C 9/005 71/28 |
| 6,074,988 | A * | 6/2000 | King | C05D 9/00 504/187 |
| 8,367,582 | B2 | 2/2013 | Dean | |
| 8,636,822 | B1 * | 1/2014 | Boyce | C05D 9/02 71/24 |
| 9,422,202 | B2 * | 8/2016 | Yasuda | C05B 7/00 |
| 9,523,535 | B1 * | 12/2016 | Christison | F26B 5/16 |
| 10,202,313 | B2 * | 2/2019 | Akhund | A01N 59/06 |
| 10,988,419 | B2 * | 4/2021 | Abu Rabeah | C05D 1/005 |
| 2004/0250581 | A1 * | 12/2004 | Rao | C05D 9/00 71/25 |
| 2008/0286383 | A1 * | 11/2008 | Nunn | B09C 1/08 424/724 |
| 2009/0095940 | A1 | 4/2009 | Dean | |
| 2009/0311331 | A1 | 12/2009 | Podczeck | |
| 2010/0018269 | A1 | 1/2010 | Prasad | |
| 2010/0275666 | A1 | 11/2010 | Matichenkov | |
| 2011/0143941 | A1 * | 6/2011 | Archer | C03C 1/002 504/187 |
| 2011/0247378 | A1 * | 10/2011 | Begley | C05C 3/00 71/8 |
| 2013/0333428 | A1 * | 12/2013 | Miranda | B09B 3/0041 71/23 |
| 2014/0345346 | A1 * | 11/2014 | Yasuda | C05B 17/00 71/32 |
| 2016/0194255 | A1 * | 7/2016 | Thompson | C05G 3/60 504/145 |
| 2017/0022119 | A1 * | 1/2017 | Alis | C05D 9/00 |
| 2017/0190634 | A1 * | 7/2017 | Malshe | C05G 5/23 |

FOREIGN PATENT DOCUMENTS

| | | |
|---|---|---|
| CN | 1817823 A | 8/2006 |
| CN | 1923766 A | 3/2007 |
| CN | 101560120 A | 10/2009 |
| CN | 101638345 A | 2/2010 |
| CN | 101704698 A | 5/2010 |
| CN | 101805219 A | 8/2010 |
| CN | 201678607 U | 12/2010 |
| CN | 102126884 A | 7/2011 |
| CN | 102408278 A | 4/2012 |
| CN | 102503673 A | 6/2012 |
| CN | 102531745 A | 7/2012 |
| CN | 102557816 A | 7/2012 |
| CN | 102850146 A | 1/2013 |
| CN | 103113156 A | 5/2013 |
| CN | 103483062 A | 1/2014 |
| CN | 103539512 A | 1/2014 |
| CN | 103819283 A | 5/2014 |
| CN | 104151041 A | 11/2014 |
| CN | 104355929 A | 2/2015 |
| CN | 104671997 A | 6/2015 |
| CN | 104876702 A | 9/2015 |
| CN | 104892105 A | 9/2015 |
| CN | 104892313 A | 9/2015 |
| CN | 104926542 A | 9/2015 |
| CN | 104987259 A | 10/2015 |
| CN | 105237292 A | 1/2016 |
| CN | 105503475 A | 4/2016 |
| CN | 105820012 A | 8/2016 |
| CN | 105967791 A | 9/2016 |
| CN | 105985158 A | 10/2016 |
| CN | 106116770 A * | 11/2016 ............... C05B 7/00 |
| CN | 106831154 A | 6/2017 |
| CN | 107011084 A | 8/2017 |
| CN | 107141074 A | 9/2017 |
| GB | 1195332 A | 6/1970 |
| KR | 20120021968 A | 3/2012 |
| RU | 97108201 A | 5/1999 |
| RU | 2525582 C2 | 8/2014 |
| RU | 2566684 C1 | 10/2015 |
| RU | 2626947 C1 | 8/2017 |
| VN | 15647 A3 | 8/2016 |
| WO | WO 01/58831 A1 * | 8/2001 ............... C05D 9/00 |

OTHER PUBLICATIONS

Search Report for Corresponding Norwegian Application No. 20171850 (2 Pages) (dated Jun. 6, 2018).

Office Action for Corresponding Taiwanese Application No. 107140984 (18 Pages) (dated Sep. 6, 2019).

International Search Report and Written Opinion for Corresponding International Application No. PCT/NO2018/050282 (10 Pages) (dated Apr. 10, 2019).

Search Report for Corresponding Chinese Application No. 201880074813.1 dated Aug. 12, 2021, 5 Pages.

* cited by examiner

NPK-SI FERTILIZER, METHOD FOR PRODUCTION AND USE THEREOF

CROSS REFERENCE TO RELATED APPLICATION

This Application is a 371 of PCT/NO2018/050282 filed on Nov. 20, 2018 which, in turn, claimed the priority of Norwegian Patent Application No. 20171850 filed on Nov. 20, 2017, both applications are incorporated herein by reference.

TECHNICAL FIELD

The present invention relates NPK-Si fertilizer products and their use in agriculture, environment protection, detoxification and other areas were active silicon fertilizers are used. In particular the present application relates to NPK-Si fertilizer products comprising a high content of silicon in the form of an amorphous silicon dioxide. The application also relates to a method for the production of NPK-Si fertilizer products comprising a high content of silicon in the form of an amorphous silicon dioxide, and the use of such NPK-Si fertilizer product.

BACKGROUND ART

Use of complex fertilizers such as NPK to enhance the growth of plants is widespread, however, its extensive use have also resulted in negative impact on the environment, such as e.g eutrophia, reduction of soil biota population and diversity, reduction of soil pH, acceleration of soil organic matter decomposition, increased erosion and increased accumulation of toxic elements, for example of heavy metals such as Cd from applied phosphates. Thus, authorities in many countries have introduced restrictions to reduce the amount of fertilizers.

Nitrogen (N), potassium (K) and phosphorus (P) are macro-nutrients, and therefore consumed in larger quantities in plants. The essential effects of the NPK elements in a NPK fertilizer are:

Nitrogen (N): Nitrogen is vital because it is an important component of chlorophyll, the compound by which plants use sunlight energy to produce sugars from water and carbon dioxide (i.e., photosynthesis). It is also a major component of amino acids, the building blocks of proteins. Without proteins, plants wither and die. Some proteins act as structural units in plant cells while others act as enzymes, which is crucial for numerus biochemical reactions. Nitrogen is a component in the energy-transfer compounds, such as ATP (adenosine triphosphate). ATP allows cells to conserve and use the energy released in metabolism. Finally, nitrogen is a significant component of nucleic acids such as DNA, the genetic material that allows cells (and eventually whole plants) to grow and reproduce. In simple terms, nitrogen promotes plant growth.

Phosphorus (P): Phosphorous is an important component in plant DNA and RNA.

Phosphorus is also important for development of roots, flowers, seeds, fruit, energy for the plant and for uptake of other elements, including N.

Potassium (K): Potassium is important for strong stem growing, movement of water and for uptake of other elements, including N, in plants. Potassium also plays a critical physiological role in carbohydrate and protein metabolism of plants, promotes flowering and fruiting.

Straight fertilizers such as Calcium Ammonium Nitrate (CAN), Ammonium Nitrate (AN), Ammonium Sulphate (AS), Urea, Single Superphosphate (SSP), Triple Superphosphate (TSP), Potash (Potassium Chloride) (MOP) and combined types such as Mono-Ammonium Phosphate (MAP), Di-Ammonium Phosphate (DAP) are well-defined products made using well-defined processes.

Compound or complex fertilizers such as NPK, are more difficult to define as there is an infinite number of N/P/K-ratios and the processes applied in their production are numerous. The product name "NPK" is normally followed by three numbers to indicate the percent of N, P (declared as $P_2O_5$) and K (declared as $K_2O$) which the product contains, e.g. 24-6-12 indicates that this particular grade contains 24% N (nitrogen compounds), 6% $P_2O_5$ (phosphorus compounds) and 12% $K_2O$ (potassium compounds). In addition, the fertilizer may contain magnesium, boron, sulphur, micro-nutrients, etc. The typical content of nutrients (labelled as $N+P_2O_5+K_2O$) will normally be in the range of 40-60%. Grades with no $P_2O_5$ or no $K_2O$ are also included in the "NPK" product range, however also commonly named NP and NK fertilizers. The most widespread NPK fertilizers in Europe contain nitrate and/or ammonium salts. Table 1 shows typical average range of nutrient content in commercially available NPK fertilizers.

NPK fertilizers can be produced in four, basically different, ways (ref. "Best Available Techniques for Pollution Prevention and Control in the European Fertilizer Industry, Booklet No. 8 of 8: "PRODUCTION OF NPK FERTILIZERS by the MIXED ACID ROUTE" Copyright 2000—EFMA, which is hereby incorporated by reference):

Ammonium phosphate/ammonium nitrate-based NPK fertilizers,
Nitrophosphate-based NPK fertilizers (mixed acid route),
Nitrophosphate-based NPK fertilizers (ODDA-route),
Mechanical blending of single or multi-nutrient components.

TABLE 1

Average range of nutrient content in commercially available NPK fertilizers (ref. International Fertilizer Association)

| Common names | N | $P_2O_5$ | $K_2O$ | S | MgO |
|---|---|---|---|---|---|
| Nutrients as % of product | | | | | |
| Nitrogen fertilizers | | | | | |
| Ammonia | 82 | 0 | 0 | 0 | 0 |
| Ammonium sulphate | 21 | 0 | 0 | 23 | 0 |
| Ammonium nitrate | 33-34.5 | 0 | 0 | 0 | 0 |
| Calcium ammonium nitrate | 20.4-27 | 0 | 0 | 0 | 0 |
| Urea | 45-46 | 0 | 0 | 0 | 0 |
| Phosphate fertilizers | | | | | |
| Single superphosphate | 0 | 16-20 | 0 | 12 | 0 |
| Triple superphosphate | 0 | 46 | 0 | 0 | 0 |
| Diammonium phosphate | 18 | 46 | 0 | 0 | 0 |
| Monoammonium phosphate | 11 | 52 | 0 | 0 | 0 |
| Ground rock phosphate | 0 | 20-40 | 0 | 0 | 0 |
| Potash fertilizers | | | | | |
| Muriate of potash (potassium chloride) | 0 | 0 | 60 | 0 | 0 |
| Sulphate of potash | 0 | 0 | 50 | 18 | 0 |
| Sulphate of potash magnesia | 0 | 0 | 22-30 | 17-22 | 10-11 |
| Complex fertilizers | | | | | |
| NPK fertilizers | 5-25 | 5-25 | 5-25 | * | * |
| NP fertilizers | 15-25 | 15-25 | 0 | * | 0 |
| NK fertilizers | 13-25 | 0 | 15-46 | * | 0 |
| PK fertilizers | 0 | 7-30 | 10-30 | * | * |

* some with S and/or Mg and/or micronutrients

It should be noted that other methods for labelling NPK fertilizers exists, e.g. there is a standard using the element values, that is the percentage amount of elemental N, P and/or K.

Plants mainly take up nutrients in the form of ions. Nitrogen is taken up as ammonium and nitrate. Potassium, as well as other metal cation nutrients, is taken up as ions.

Phosphorous is mainly taken up as phosphates (hydrogen phosphates and dihydrogen phosphates). Boron is not taken up as a charged ion, but rather boric acid.

Silicon (Si) has traditionally been considered as beneficial. Many cultivated plants take up more Si than N, P or K (Epstein, E. (2001) "Silicon in plants: facts vs. concepts", Studies in Plant Science, 8, 1-15).

In 2004 it was discovered that plant has active transport of this element (Ma, J. F., et al. (2006) "A silicon transporter in rice", Nature, 440(7084), 688). During the recent years, the importance and value of Si as a nutrient in crop has been recognized, especially to stimulate growth of Si-accumulating plants such as rice and sugar canes, and there are many reports related to the role of Si in nutrition of plants; "A Review of Silicon in Soils and Plants and Its Role in US Agriculture: History and Future Perspectives", B. S. TUBANA et al., Soil Science, Vol. 181, No. 9/10, 2016. In several countries, Si is now classified as a beneficial element for agriculture (Japan, China, USA, South-Korea).

Thus, it is known that silicon may be a highly beneficial element to enhance growth of plants, and prevent negative influence for many stresses. Silicon fertilizing protects plants against biotic (diseases, insect attack) and abiotic stresses (unfavourable climate condition, salt, toxic influence), and reduces the content of mobile Al and heavy metals in soil and total content of Al and heavy metals in the cultivated plants (Meharg C, Meharg AA (2015) "Silicon, the silver bullet for mitigating biotic and abiotic stress, and improving grain quality, in rice?" Environmental and Experimental Botany, 120:8-17).

Silicon is the second most abundant element in the earth's crust. However, plants can only take up Si in the form of monosilicic acid, or possibly lower oligomers of monosilicic acid, herein also denoted as plant-available Si or plant-available Si. Solutions of monosilicic acid are not thermodynamically stable, but will over time lead to polymerization of the monosilicic acid into polysilicic acid, and the Si becomes plant-unavailable. In natural Si containing minerals, the Si is predominantly present in crystalline form or bound with other elements as silicate minerals with low solubility and hence less accessible to the plants through the weathering of the minerals.

The most common and widespread Si-fertilizers used are slags, i.e. byproducts from steel and pig iron production, and natural minerals like diatomite, zeolite, vermiculite etc. These suffer from major drawbacks: 1) they are not very effective Si-sources, hence large quantities are needed (for slags typically 1-2 tons/ha/year); 2) slags are also usually contaminated by heavy metals, which may be absorbed by the plants and thus imply a health risk to the population consuming crop fertilized with such slags.

Other known silicon fertilizers include potassium silicate, sodium silicate and calcium silicate. The use of alkaline media can increase the solubility of Si-rich silicate materials, however using such alkaline silicate solution has a drawback of high pH, which may be poisonous to the plants. Thus, a high degree of dilution with water (e.g. 1:100) may be required prior to fertilizing with an alkaline silicate solution, adding cost and complexity.

The required high volumes of slag-based and mineral based Si-fertilizers are much higher than the required volume of traditional NPK-fertilizers. Existing practice require two different fertilizing operations when applied by the farmers, and may require high volumes of Si-fertilizer (slag) and separate logistically arrangements as well, which impose both a practical and an economical problem to the farmers. Chinese patent application 1923766 discloses a NPK composite fertilizer including slag with calcium silicate. However, as stated above, fertilizing with silicate containing slags has some drawbacks. Chinese patent application 101805219 discloses a four-component fertilizer with nitrogen, phosphorus, potassium and silicon. The four-component fertilizer comprises the following raw materials of 9 to 10 wt % of Silicon-potash fertilizer, 11 to 25 wt % of carbamide, 10 to 20 wt % of potassium chloride, 23 to 35 wt % of monoammonium phosphate, 12 to 26 wt % of ammonium chloride, 1.3 to 1.7 wt % of synthetic ammonia, 2.5 to 3 wt % of sulphuric acid and less than 0.05 wt % of attapulgite. In the technical scheme provided by the invention, no mine slag or furnace slag is used so that no crushing process exists, and the advantages of energy saving, environment protection, technique link reduction and transport cost reduction can be shown. In the fertilizer according to CN 101805219 slag is not used as the source of silicon, instead silicate potash is used. As previously stated silicon minerals have low solubility, therefore in order to provide sufficient silicon to the soil and plants a large amount of the fertilizer is needed.

There is a need for an efficient Si-fertilizer which adds Si in a soluble and plant-available form, preferably as monosilicic acid. Studies performed by the present inventors have shown that certain amorphous silica (silicon dioxide) may be highly useful in this regard. The solubility of Si from amorphous silica is much higher than from crystalline silica or Si-minerals. This means that the amount of Si-fertilizers in terms of kg/ha can be substantially reduced. In turn, this may open for making a combined product of Si and NPK-fertilizer tailor made for different needs of nutrients.

These and other advantages with the present inventions will become evident in the following description.

SUMMARY OF THE INVENTION

The present invention combines a much more effective and more environmentally friendly Si-fertilizer with NPK fertilizer in one and the same product. The present invention simplifies distribution and usage of Si- and NPK-fertilizers by the farmer. Thus, the present invention provides a more cost effective and hence affordable combined NPK-Si-fertilizer for a wide range of agricultural products.

It has been demonstrated that combined use of microsilica and mineral NPK fertilizer in a combined NPK-Si fertilizer resulted in a surprising increased uptake of phosphorus by the plants, which may result in a less rate of P in the NPK recipe, an advantage as suitable resources for phosphorus (apatite and/or other phosphate resources) is drastically declining in the world. Another advantage of less use of phosphorus is less spreading of heavy metals, which are commonly contaminating phosphate sources.

It has also been demonstrated that combined use of microsilica and mineral NPK fertilizer has resulted in a surprising increased crop yield, which indicates an increased uptake of N. The increase in crop yield is at a level which compensate for reduced use of mineral NPK fertilizer with as much as 30-50% while maintaining crop yield. Results from such novel demonstration may play an important role of environmental impact, such as less soil degradation (increasing Corg (organic carbon) in soil vial additional plant root formation; improvement of soil pH, because equilibrium pH of microsilica is 7, while traditional NPK fertilizer is 4-5; optimize soil biota vial increasing population of *Azotobacter* microorganisms and micorrhiza, increasing soil adsorption capacity and reduction pollutants mobility), less euthrophia (nutrients leaching) and less use of nitrogen, of which a high portion is converted to NOx gases and leads to global warming. Another advantage identified by the present invention is reduction in use of pesticides. It is also observed that the present NPK-Si fertilizer improves plants ability to build water reservoirs in the plant and thereby is more resistant to drought periods (abiotic stress). By the present combined NPK-Si fertilizer it is thus shown a novel rate of impact on uptake of P and K with impact for stimulating biomass growth. The stimulation of the plant root system increased the plant adsorption for all elements, including K. The increasing of the monosilicic acid concentration can transform plant unavailable P to plant available forms, which also improve cultivated plants P nutrition.

In a first aspect the present invention relates to a combined NPK-Si fertilizer product comprising a mineral NPK fertilizer, which comprises at least one nutrient compound of nitrogen, phosphorous or potassium, and a particulate amorphous silicon dioxide, wherein the ratio of the mineral NPK fertilizer to the amorphous silicon dioxide is from 10:90 to 90:10, based on the dry weight of the at least one nutrient compound of nitrogen, phosphorous or potassium, and the amorphous silicon dioxide contained in the product.

In a first embodiment of the invention the mineral NPK fertilizer contains at least one of the following nutrient compounds:
(a) nitrogen (N), in the form of nitrate ($NO_3^-$), ammonium ($NH_4^+$) and/or urea ($CO(NH_2)_2$),
(b) phosphorous (P), in the form of phosphate ($PO_4^{3-}$), hydrogen phosphate ($HPO_4^{2-}$) and/or dihydrogen phosphate ($H_2PO_4^-$), and/or
(c) potassium (K), in the form of potassium salt ($K^+$).

In a second embodiment according to the preceding embodiments of the invention the particulate amorphous silicon dioxide is microsilica (silica fume) and/or rice husk ash.

In third embodiment the particulate amorphous silicon dioxide is in the form of agglomerated particles, micropellets, pellets or granules.

In fourth embodiment the ratio of the mineral NPK fertilizer to the amorphous silicon dioxide is selected from the ranges; from 20:80 to 80:20, based on the dry weight of the at least one nutrient compound of nitrogen, phosphorous or potassium, and the amorphous silicon dioxide contained in the product.

In sixth embodiment the NPK-Si fertilizer product is in the form of a physical mixture or a blend of at least one particulate mineral NPK fertilizer compound and the particulate amorphous silicon dioxide.

In a seventh embodiment the amorphous silicon dioxide is in the form of inclusions in at least one particulate NPK fertilizer or on the surface of at least one particulate NPK fertilizer.

In an eight embodiment the particulate mineral NPK fertilizer is in the form of a compound fertilizer containing nutrient compounds of N, P and K;
N and P; P and K; and/or N and K; and/or
in the form of single nutrient fertilizer containing compounds of N, P and/or K.

In a ninth embodiment the NPK-Si fertilizer is in the form of a compound fertilizer containing at least one compound of N, P and/or K and the particulate amorphous silicon dioxide.

In a tenth embodiment the compound fertilizer contains nutrient compounds of N, P and K;
N and P; P and K; and/or N and K; and/or
in the form of single nutrient fertilizer containing compounds of N, P and/or K,
in addition to the said particulate amorphous silicon dioxide.

In an eleventh embodiment the NPK-Si fertilizer is in the form of granules, prills, extrudates, pellets or agglomerates.

In a twelfth embodiment the content of nitrogen nutrient in the NPK fertilizer is up to about 46 weight-% in terms of elemental N.

In a thirteenth embodiment the content of phosphorous nutrient in the NPK fertilizer is up to 55 weight-% in terms of $P_2O_5$).

In a fourteenth embodiment the contents of potassium nutrient in the NPK fertilizer is up to 62 weight-% in terms of $K_2O$.

In a fifteenth embodiment the NPK-Si fertilizer product also comprises other nutrients chosen from the group: calcium (Ca), sulphur (S) and magnesium (Mg), and/or micronutrients chosen from the group: zinc (Zn), copper (Cu), iron (Fe), boron (B) and molybdenum (Mo).

In a second aspect the present invention relates to a method for the production of a combined NPK-Si fertilizer product according to the first aspect and any of the above first to fifteenth embodiments, the method comprises at least one of the following steps (i) adding particulate amorphous silicon dioxide in a liquid stage of a NPK production process forming a slurry, the said liquid stage is subsequent to any acid digestion step of the NPK production process, followed by granulating or prilling, or (ii) adding particulate amorphous silicon dioxide subsequent the liquid NPK production process and during the agglomeration process of the production of the mineral NPK fertilizer, or (iii) dry-mixing at least one preformed particulate NPK fertilizer with a particulate amorphous silicon dioxide, thereby forming a mechanical blend.

In a first embodiment of the method, in (ii) the particulate amorphous silicon dioxide is in the form of a slurry or dispersion.

In a second embodiment of the method, in (ii) the slurry or dispersion is sprayed, or sprinkled during the granulation or prilling process.

In a third embodiment of the method the mineral NPK fertilizer contains at least one of the following nutrient compounds:
(a) nitrogen (N), in the form of a nitrate ($NO_3^-$), an ammonium ($NH_4^+$) and/or urea ($CO(NH_2)_2$),
(b) phosphorous (P), in the form of a phosphate ($PO_4^{3-}$), hydrogen phosphate ($HPO_4^{2-}$) and/or a dihydrogen phosphate '($H_2PO_4^-$), and
(c) potassium (K), in the form of a potassium salt (K).

In a fourth embodiment of the method the particulate amorphous silicon dioxide is microsilica (silica fume) and/or rice husk ash.

In a fifth embodiment of the method the particulate amorphous silicon dioxide is in the form of agglomerated particles, micropellets, pellets or granules.

In a sixth embodiment of the method the ratio of the mineral NPK fertilizer to the amorphous silicon dioxide is selected from the ranges; 20:80 to 80:20, based on the dry weight of the at least one nutrient compound of nitrogen, phosphorous or potassium, and the amorphous silicon dioxide contained in the product.

In a seventh embodiment of the method the content of nitrogen nutrient in the NPK fertilizer is up to about 46 weight-% in terms of elemental N.

In an eighth embodiment of the method the content of phosphorous nutrient in the NPK fertilizer is up to 55 weight-% in terms of $P_2O_5$).

In a ninth embodiment of the method the contents of potassium nutrient in the NPK fertilizer is up to 62 weight-% in terms of $K_2O$.

In a tenth embodiment of the method the NPK-Si fertilizer product also comprises other nutrients chosen from the group: calcium (Ca), sulphur (S) and magnesium (Mg), and/or micronutrients chosen from the group: zinc (Zn), copper (Cu), iron (Fe), boron (B) and molybdenum (Mo).

In a third aspect the present invention relates to the use of the combined NPK-Si fertilizer according to the first aspect, and the first to the fifteenth embodiment of the invention according to the first aspect, for supplying nutrients and/or soil conditioners to agricultural or greenhouse soil.

In a fourth aspect the present invention relates to the use of the combined NPK-Si fertilizer according to the invention, for supplying nutrients and/or soil conditioners to agricultural or greenhouse soil where the at least one particulate mineral NPK fertilizer, which comprises at least one nutrient compound of nitrogen, phosphorous or potassium; and the particulate amorphous silicon dioxide, are applied as separate constituents.

In a further aspect, the present invention relates to a method for supplying nutrients and/or soil conditioners to agricultural or greenhouse soil, comprising applying a combined NPK-Si fertilizer, according to the present invention.

In a further aspect, the present invention relates to a method for supplying nutrients and/or soil conditioners to agricultural or greenhouse soil, comprising applying a combined NPK-Si fertilizer according to the present invention, where the at least one particulate mineral NPK fertilizer, which comprises at least one nutrient compound of nitrogen, phosphorous or potassium; and the particulate amorphous silicon dioxide, are applied as separate constituents.

DETAILED DESCRIPTION OF THE INVENTION

Figure 1:
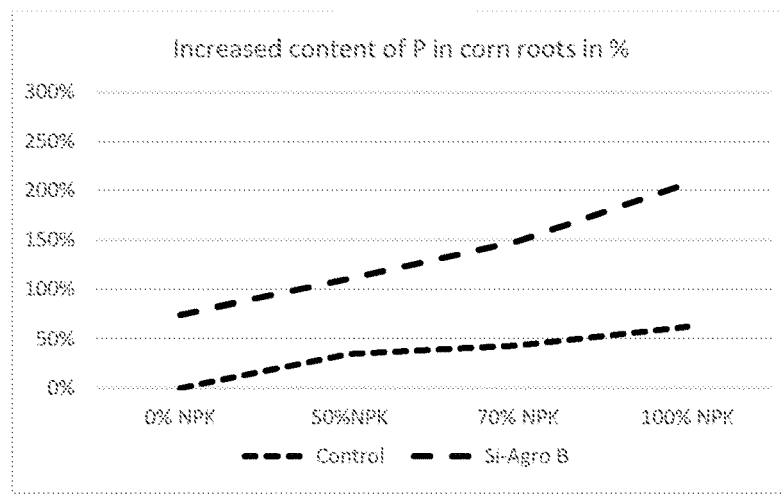
FIG. 1: Test results showing increased uptake of P in corn roots with application of the fertilizer according to the present invention.

The present invention provides a combined NPK-Si fertilizer, comprising at least one mineral NPK fertilizer, which comprises at least one nutrient compound of nitrogen, phosphorous or potassium; and a particulate amorphous silicon dioxide, wherein the ratio of the at least one mineral NPK fertilizer to the amorphous silicon dioxide is from 10:90 to 90:10, based on the total dry weight of the at least one nutrient compound of nitrogen, phosphorous or potassium present in the at least one mineral NKP fertilizer, and the amorphous silicon dioxide, contained in the product, which combined NPK-Si fertilizer alleviates at least some of the disadvantages associated with prior art silicon containing fertilizers.

In the present context the term "plant-available Si" and "bio-available Si" should be understood as denoting compounds of silicon which are in a transferable form to be taken up or absorbed by the roots of the plants, that is monosilicic acid, $H_4SiO_4$, commonly noted $Si(OH)_4$, or possibly lower oligomers of monosilicic acid.

Microsilica (MS), also known as silica fume, is an amorphous form of silica having a much higher solubility compared to crystalline silica and various silicates, which are the dominating forms of silicon already present in the soil. The term "microsilica" and "MS" used in the specification and claims of this application refer to particulate, amorphous $SiO_2$ which may be obtained from a process in which silica (quartz) is reduced to SiO-gas and the reduction product is oxidized in the vapour phase to form amorphous silica particles. MS is available with uniform particle morphology and particle size distribution within a narrow range, as well as a suitable high specific surface area. Microsilica may contain at least 70% by weight silica ($SiO_2$), and preferably >95% by weight $SiO_2$, and has a specific gravity of 2.1-2.3 g/cm$^3$ and a specific surface area of 5-50 m$^2$/g (BET), typically about 20 m$^2$/g. The primary particles are substantially spherical and may have an average size of about 0.15 μm, as calculated by volume. MS is preferably obtained as a co-product in the production of silicon alloys in electric reduction furnaces, but may also be (co)-produced in other processes. Such produced MS has high purity and is not contaminated by heavy metals.

The high specific surface area increases the dissolution rate of microsilica to the plant-available form of silicon. Microsilica suitable for the present invention should have a specific surface area about 5-50 m$^2$/g (BET), and a particle size in the nano or micron area, e.g. 0.01-50 μm, preferably less than 5 μm. A uniform morphology and particle size distribution of the MS favours uniform dissolution of the particles. In the following detailed description of the invention the amorphous silica particles are microsilica, it should however be noted that the amorphous silica particles may be other types, such as amorphous rice husk ash (RHA).

In some embodiments the amorphous silica particles should be in the form of an agglomerate of the particles, such as pellets or granules. The size (diameter) of such agglomerated particles should preferably be within about 0.01 mm to about 5 mm.

In the present context the terms "NPK", "NPK fertilizer" and "NPK mineral fertilizer" should be understood to denote NPK macronutrient fertilizers, which are generally known in the field. Such NPK fertilizers are generally labelled with an NPK analysis, based on the relative content of the chemical elements nitrogen, phosphorus and potassium, and any other nutrients when present. The content of the nutrients have traditionally been declared as N for nitrogen content; $P_2O_5$ for phosphorous and $K_2O$ for potassium, but it should be noted that the declaration of the nutrient can also be declared as content of element, and possibly other ways. The NPK fertilizers according to the present invention may comprise all three major nutrients N, P and K; two major nutrients (binary fertilizer, NP, NK, PK); or only one of the major nutrient, also denoted straight or single nutrient fertilizers, including compounds of one of N, P and K. It should be understood that the N, P and K nutrients are present in the form of compounds in the fertilizer, as generally known in the art. The NPK fertilizer according to the present invention thus contains at least one of the following nutrients: Nitrogen (N), in the form of nitrates ($NO_3^-$), ammonium ($NH_4^+$) and/or urea ($CO(NH_2)_2$); Phosphorous (P), in the form of a hydrogen phosphate ($HPO_4^{2-}$) and/or a dihydrogen phosphate ($H_2PO_4^-$) and/or phosphate ($PO_4^{3-}$); and Potassium (K), in the form of a potassium salt ($K^+$).

NPK fertilizers suitable for the present invention may also comprise one or more secondary nutrients (Ca, S and Mg) and/or micro nutrients (Fe, Mn, Zn, B, Cu, Mo and Cl), as generally known in the field. The fertilizers may contain fillers, and various fillers are available in the fertilizer industry. The fillers are normally inactive, i.e. not a nutrient, but may improve soil properties, The fillers often have a role for improving the stabilization of the fertilizer product during storage and handling (anticaking agents). Good quality mineral NPK fertilizers consist almost entirely of the nutrient compounds, and only very small amounts of additives e.g. anticaking agents and filler. Therefore a straight NPK fertilizer such as ammonium nitrate consists substantially of the ammonium and nitrate, which are the forms of nitrogen nutrient that are taken up by the plants. Correspondingly, straight P or K NPK fertilizer will substantially consist of the respective nutrient compositions. The same also applies for NPK fertilizers containing two of the major nutrients and NPK fertilizers comprising all three major nutrients.

Thus in the NPK-Si-fertilizer according to the present invention, wherein the ratio of the mineral NPK fertilizer to the amorphous silicon dioxide is from 10:90 to 90:10, based on the dry weight of the product, the relative amount of the NPK part is to be based on the sum of the N, P and/or K nutrient compounds (i.e. any present nitrogen compounds, phosphorous compounds and potassium compounds) in the NPK fertilizer. Thus any filler or additive should not be included in the dry weight basis. There exists a wide variety of commercial mineral NPK fertilizer with different amounts of N, P, and/or K nutrient content, with or without filler compounds and any other additive.

NPK fertilizers may be produced as a compound fertilizer, where the ingredients are mixed before being formed into particles. Each particle contains compounds of N, P and/or K, ensuring a homogenous product. The NPK fertilizers may also be produced as a blended fertilizer, which is a physical mixture of dry fertilizer particles containing different nutrient compounds.

The most common ways to produce NPK fertilizers are the following processes: The nitrophosphate process (ODDA-route), which involves acidifying phosphate rock with nitric acid, thereby producing a mixture of phosphoric acid and calcium nitrate. The mixture is cooled to below 0° C. such that calcium nitrate crystallizes and may be separated from the phosphoric acid. The calcium nitrate produces nitrogen fertilizer (ammonium nitrate and/or calcium ammonium nitrate), while the filtrate, which is mainly phosphoric acid with some nitric acid and minor amounts of calcium nitrate may be neutralized with ammonia, mixed with potassium (and/or other nutrient) to produce a compound NPK fertilizer according to generally known processes.

In the mixed acid process phosphate rock is digested with nitric acid. Other raw materials such as sulphuric, phosphoric and nitric acid or ammonium nitrate solution are added after the digestion. The acid slurry is thereafter ammoniated and after neutralisation, other components such as containing phosphates, sulphates, potassium and/or magnesium are added. The compound fertilizer is granulated, dried and processed according to generally known processes.

In a mechanical blending process of single or multi-nutrient NPK components, the process entails a physical blending of the ingredients in dry form. The ingredients are in the form of preformed separate particles, which normally will have different bulk density and particle sizes. In order to achieve a homogenous and even blend, care should be taken such that segregation and caking of the fertilizer product is avoided. According to the present invention microsilica may be one of the dry blending components.

The NPK-Si fertilizers according to present invention should have ratio of the mineral NPK fertilizer components, i.e. the at least one nutrient compound of nitrogen, phosphorous or potassium, to the microsilica from about 10:90 to 90:10, based on the dry weight of the at least one nutrient compound of nitrogen, phosphorous or potassium, and the amorphous silicon dioxide contained in the product. Throughout this specification and in the claims the weight ratio of mineral NPK fertilizer to amorphous silica is based on the sum of dry components of the at least one nutrient compounds of nitrogen, phosphorous or potassium, and the amorphous silicon dioxide contained in the NPK-Si fertilizer product according to the present invention. The NPK-Si fertilizers may be produced in a wide variety of ranges, e.g. the ratio of the mineral NPK fertilizer components to the microsilica may be selected from the ranges; 20:80 to 80:20, from 30:70 to 70:30, from 40:60 to 60:40 or 50:50, based on dry weight of product. It should be noted that the NPK-Si fertilizers according to the present invention may include compounds of all three major nutrients N, P and K; two of the major nutrients (NP, NK or PK), or only one of the major nutrients N, P and K. In general the ratio between the NPK mineral component to microsilica should be within the defined ranges; 10:90 to 90:10, and subranges 20:80 to 80:20, from 30:70 to 70:30, from 40:60 to 60:40 or 50:50.

If the amount of microsilica in the NPK-Si fertilizer is more than about 90% (based on dry weight of the product), the amount of NPK nutrients in the fertilizer will in most cases become too low to cover the macronutrient requirement, resulting in reduced crop yield and reduced plant health. A microsilica amount of less than about 10% (based on dry weight of the product) will in most cases not cover the silicon nutrient demand of the plants, in addition the beneficial, synergistic effect of the combined fertilizers, such as increased P uptake and increased biomass yield, becomes small. Tests show that a ratio of mineral NPK fertiliser compounds to microsilica between 30:70 and 70:30 (based on dry weight of the product, as defined above) give very good results. The addition of microsilica in combination with traditional NPK mineral fertilizer shows a synergistic effect, especially with respect to increased phosphorous uptake in plants and increased biomass, compared to tests where NPK fertilizer is applied alone (without microsilica).

The NPK-Si fertilizer may be in the form of a blended fertilizer. The blended NPK-Si fertilizer may be a physical (mechanical) mixture of a compound NPK fertilizer and microsilica. The blended NPK-Si fertilizer may alternatively be a physical mixture of one, two or three single major nutrients and microsilica, or the major nutrients may be in the form of a NPK fertilizer containing two of the major nutrients (NK, NP or PK) mixed with microsilica. In all the aforesaid circumstances the nutrients to be mixed should be in the form of separate, dry particles. The microsilica should preferably be in the form of an agglomerate so as to become more compatible with the other ingredients in the blend. The blended NPK-Si fertilizer should have a particle size distribution and bulk density assuring a good quality fertilizer which is not prone to segregation of any of the nutrient particles during handling and application.

The NPK-Si fertilizer according to the present invention may be in the form of a compound fertilizer, i.e. the nutrients are mixed before or during formation of particles (agglomerates), usually granules or prills. The microsilica might be added as a particulate material during the wet stages of the NPK production processes. The microsilica should be added in the form of an agglomerate (such as pellet or granule), in order to essentially retain the properties of the microsilica. The addition of microsilica should take place after the neutralization step. A compound NPK-Si fertilizer, according to the present invention, may also be manufactured by co-sprinkle microsilica as a slurry during prilling or granulation process. Adding the microsilica during the wet stage of the NPK production process ensures production of a homogenous fertilizer product, in which microsilica is evenly distributed and an inherent part of the fertilizer granule particle or prills. A wide variety of NPK-Si fertilizer ranges and grades may thus be produced, within the claimed area, adapted to requirements of different crops and/or soils conditions.

In all the above embodiments of the NPK-Si fertilizers according to the present invention, the product may also comprise one or more of secondary nutrients (Ca, S and Mg) and/or micro nutrients (Fe, Mn, Zn, B, Cu, Mo and Cl).

The present NPK-Si fertilizer is used for supplying nutrients and/or soil conditioners to agricultural or greenhouse soil. By the method of applying the present combined NPK-Si fertilizer according to the present invention, the farmers fertilizing operations are simplified as the Si nutrient is distributed together with the NPK fertilizer in a combined product. Some of the benefits with the fertilizer according to the present inventions are reduction of the volumes of fertilizers to be applied, and more simple logistically arrangements. It should however be noted that the combined NPK-Si fertilizer according to the present invention may be applied to agricultural or greenhouse soil as separate constituents, of particulate mineral NPK fertilizer and particulate amorphous silicon dioxide, which are used in combination.

The present invention will be illustrated by the following examples. The examples should not be regarded as limiting for the present invention as these are meant to illustrate different embodiments of the invention and the effect of the usage of the invention.

EXAMPLES

In the following examples mineral NPK fertilizer containing 16% N, 16% P and 16% K (elemental analysis) was used, unless another composition of the mineral NKP fertilizer is specified in the tests.

The microsilica used in the tests was soft micropellets formed by an air-densification process, with diameter about 0.01-1 mm, easily dispersible, and with $SiO_2$ content about 96%.

The tests were executed as greenhouse tests. Calcareous soil with pH around 8.3-8.5 was used, unless otherwise stated. In each test the fertilizers was applied by mixing the specified doses into the soil prior to adding seeds.

The mineral NPK fertilizer is hereafter denoted "NPK", and the microsilica is hereafter denoted MS.

Description of plant analysis for phosphorous (P) and potassium (K): Three plant samples were collected from each test, washed in distilled water, dried at the temperature +65° C., then ground and passed through 0.1 mm sieve. Microwave digestion of plant samples was used for total P and K analyses. A plant sample of 0.20±0.01 g was predigested in a mixture of 4 mL of concentrated $HNO_3$ and 2 mL of 30% $H_2O_2$ overnight followed by microwave digestion for 30 min. K and P were analyzed by ICP-MS I Cap-Q (USA) according to standard methods.

Description of plant analysis for nitrogen (in the form of nitrate):

The soluble forms of $NO_3$ in the apoplast and symplast of roots, stems, and leaves were analyzed using the following technique.

Fresh plant tissue samples 0.20+0.01 g were cut into fragments about 1-2 cm in length and put into a plastic bottle. Then 50 mL of distilled water was added and the mixture was agitated for 24 h to provide diffusion of the apoplast solution into external solution. The mixture was filtrated and clean solution was analyzed for $NO_3$ by using compact $NO_3$ meter (Twin $NO_3$ Horiba, Japan). The samples of plant tissue after filtering were homogenized to crush all cell walls. Homogenized slurry was mixed with 50 mL of distilled water and agitated for 1 h. As a result, the diluted symplast solution was obtained and analyzed after centrifugation for monosilicic acid and soluble forms of $NO_3$ by the methods described above. Based on the data on plant tissue moisture, the contents of monosilicic acid and soluble forms of $NO_3$ were calculated on a dry weight.

Example 1. Uptake of Phosphorous

In the following tests the plant uptake of phosphorous (P) was measured. The amount of P was measured on corn and sunflower, in the roots and in shoots (stem and leaves).

Each table include a control test showing the uptake after applying 0 wt %, 50 wt %, 70 wt % or 100 wt % of NPK. 100 wt % NPK is equivalent to 300 kg/ha of NPK and 50 wt % is equivalent to 150 kg/ha of NPK. The tests where MS was added are generally denoted as "Si Agro B" in the tables below and in the accompanying drawings. The Si Agro B tests show the uptake of P in roots and shoots after applying 300 kg/ha of MS and 0 wt %, 50 wt %, 70 wt % or 100 wt % of NPK. 100 wt % and 50 wt % NPK is equivalent to 300 kg/ha and 150 kg/ha of NPK, respectively.

The numbers in the column "Increased P in wt %" shows the wt % increase in uptake of P (elemental P) in roots and shoots, respectively. The numbers are always compared to the results obtained with the Control when 0% NPK is applied. As an example we see that application of MS (300 kg/ha) and 0% NPK gives a 74 wt % increase in P in the roots (Table 2). This is calculated from the measured mg P/kg of dry roots of 0.58 in the Control and 1.01 in the roots exposed to MS. Another example is that application of MS (300 kg/ha) and 50 wt % (150 kg/ha) NPK results in an increase of 51 wt % in P uptake in shoots compared to Control with 0% NPK applied, see Table 3.

TABLE 2

P uptake in corn roots.

| Treatment of corn Relative use | mg P per/ kg of dry roots: | | | | Increased P in wt % | | | |
|---|---|---|---|---|---|---|---|---|
| of NPK: | 0% | 50% | 70% | 100% | 0% | 50% | 70% | 100% |
| Control | 0.58 | 0.78 | 0.83 | 0.94 | 0% | 34% | 43% | 62% |
| Si Agro B (300 kg/ha MS) | 1.01 | 1.22 | 1.44 | 1.78 | 74% | 110% | 148% | 207% |

TABLE 3

P uptake in corn shoots.

| Treatment of corn Relative use | mg P per kg of dry shoots: | | | | Increased P in wt % | | | |
|---|---|---|---|---|---|---|---|---|
| of NPK: | 0% | 50% | 70% | 100% | 0% | 50% | 70% | 100% |
| Control | 1.22 | 1.38 | 1.56 | 1.62 | 0% | 13% | 28% | 33% |
| Si Agro B (300 kg/ha MS) | 1.48 | 1.84 | 2.11 | 2.7 | 21% | 51% | 73% | 121% |

Figure 2:
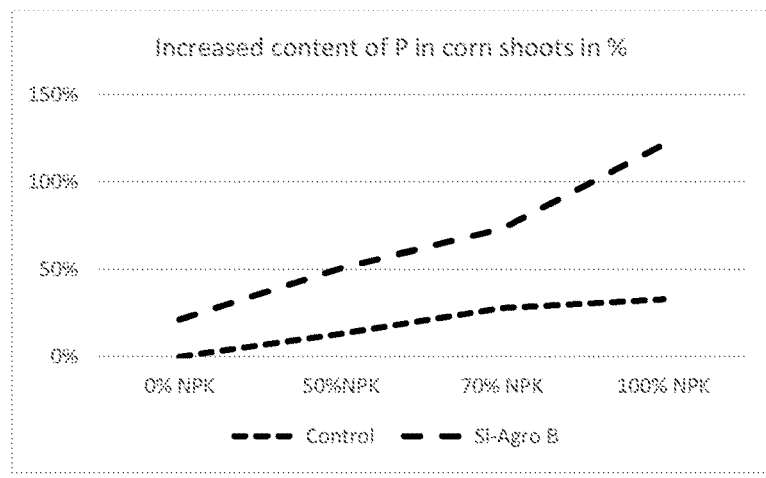
FIG. 2: Test results showing increased uptake of P in corn shoots with application of the fertilizer according to the present invention.

As seen in Tables 2 and 3, and in FIGS. 1 and 2, the content of P in the roots and shoots (stem and leaves) increased by 62% and 33% by applying the NPK containing 16% N, 16% P and 16% K (300 kg/ha-100 wt %). With applying 300 kg/ha of MS the P uptake increased with 110% and 21% in roots and shoots, respectively, when 0 wt % of NPK was used. By use of 300 kg/ha MS together with 300 kg/ha (100 wt %) NPK the P uptake increased as much as 207% and 121%. Using only 150 kg/ha (50 wt %) NPK together with 300 kg/ha MS the P uptake was still 110% and 51%, in roots and shoots, respectively, which is significant more (almost double) than the P uptake when using 300 kg/ha (100%) NPK and no MS. It is therefore possible to reduce the amount of NPK by a replacement with the MS.

There is a strong synergy effect between NPK and MS as seen from the result above: 300 kg/ha NPK gives corn roots 62% increase uptake, while 300 kg/ha MS alone gives 74% uptake; theoretically together 136% increase of uptake. By applying both ingredients, 300 kg/ha NPK+300 kg/ha MS the uptake is 207%, or around 50% more than the sum above; a proof of a positive synergy effect of the combination. Such synergy is also present when less NPK is used.

Similar effects are seen in sunflower, and also with similar magnitudes:

TABLE 4

P uptake in sunflower roots.

| Treatment of sunflower Relative use | mg P per kg of dry roots: | | | | Increased P in wt % | | | |
|---|---|---|---|---|---|---|---|---|
| of NPK: | 0% | 50% | 70% | 100% | 0% | 50% | 70% | 100% |
| Control | 0.35 | 0.42 | 0.54 | 0.61 | 0% | 20% | 54% | 74% |
| Si Agro B (300 kg/ha MS) | 0.38 | 0.55 | 0.69 | 0.72 | 9% | 57% | 97% | 106% |

TABLE 5

P uptake in sunflower shoots.

| Treatment of sunflower Relative | mg P per kg of dry shoots: | | | | Increased P in wt % | | | |
|---|---|---|---|---|---|---|---|---|
| use of NM: | 0% | 50% | 70% | 100% | 0% | 50% | 70% | 100% |
| Control | 0.58 | 0.64 | 0.78 | 0.85 | 0% | 10% | 34% | 47% |
| Si Agro B (300 kg/ha MS) | 0.7 | 0.66 | 0.79 | 1.22 | 21% | 14% | 36% | 110% |

Figure 3:
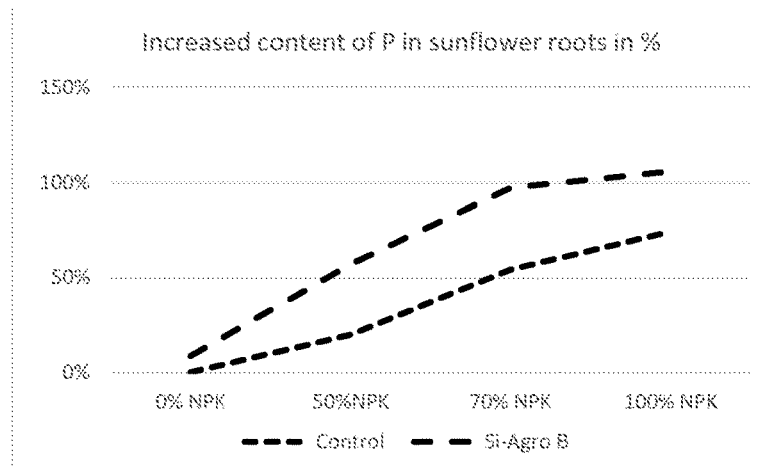
FIG. 3: Test results showing increased uptake of P in sunflower roots with application of the fertilizer according to the present invention.
Figure 4:
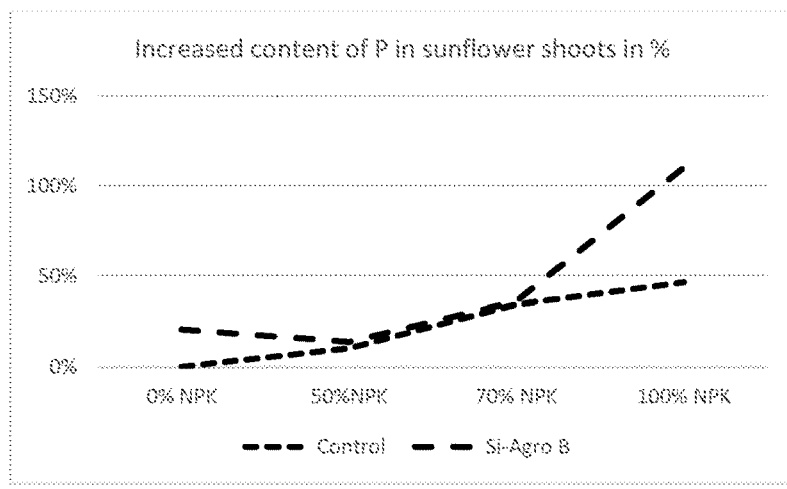
FIG. 4: Test results showing increased uptake of P in sunflower shoots with application of the fertilizer according to the present invention.

As seen in Tables 4 and 5, and in FIGS. 3 and 4, the addition of 300 kg/ha (100%) NPK increased the uptake of P by 74% and 47% in sunflower roots and shots, respectively, while the MS product alone without use of NPK increased the P uptake by 9% and 21%. By combining MS with 100% (300 kg/ha) NPK the increase in P uptake was 106% and 110%. Also for sunflower the amount of NPK can be reduced by replacement with MS.

Example 2. Uptake of Potassium

In the following tests the plant uptake of potassium (elemental K) was measured. The tests according to the present invention are denoted as "Si Agro B" in the tables below and in the accompanying drawings. The amount of K was measured in corn and sunflower, in the roots and in shoots (stem and leaves). The tables should be read the same way as explained above for the measurements of P uptake.

TABLE 6

K uptake in corn roots.

| Treatment of corn Relative usage | mg K per kg of dry roots | | | | Increase of K in wt % | | | |
|---|---|---|---|---|---|---|---|---|
| of NPK | 0% | 50% | 70% | 100% | 0% | 50% | 70% | 100% |
| Control | 0.33 | 0.13 | 0.54 | 0.63 | 0% | 30% | 64% | 91% |
| Si Agro B (300 kg/ha MS) | 0.38 | 0.45 | 0.56 | 0.65 | 15% | 36% | 70% | 97% |

TABLE 7

K uptake in corn shoots.

| Treatment of corn Relative usage of NH | mg K per kg of dry shoots | | | | Increase of K in wt % | | | |
|---|---|---|---|---|---|---|---|---|
| | 0% | 50% | 70% | 100% | 0% | 50% | 70% | 100% |
| Control | 0.43 | 0.62 | 0.74 | 0.84 | 0% | 44% | 72% | 95% |
| Si Agro B (300 kg/ha MS) | 0.46 | 0.64 | 0.75 | 0.85 | 7% | 49% | 74% | 98% |

Figure 5:
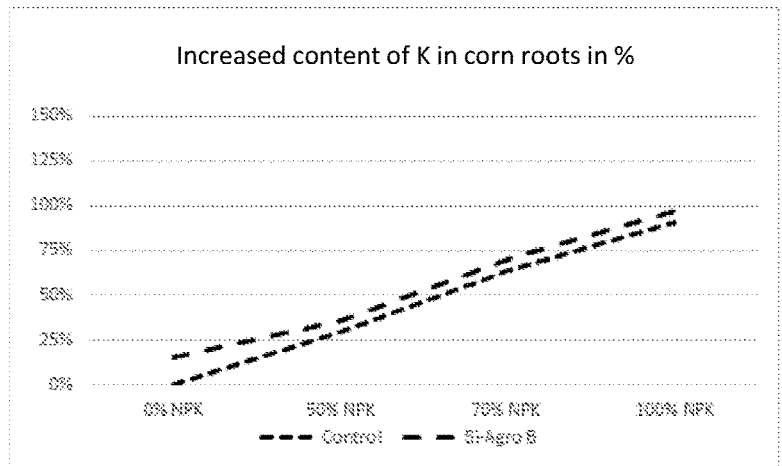
FIG. 5: Test results showing increased uptake of K in corn roots with application of the fertilizer according to the present invention.
Figure 6:
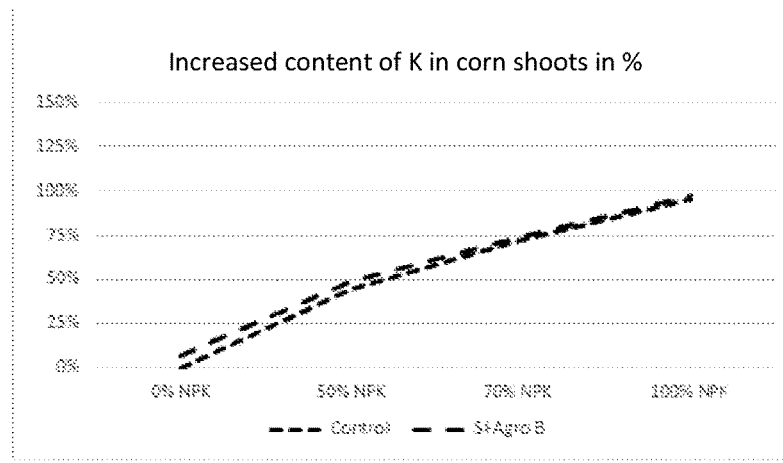
FIG. 6: Test results showing increased uptake of K in corn shoots with application of the fertilizer according to the present invention.

As seen in tables 6 and 7, (also refer to FIGS. 5 and 6) NPK usage increased the K content of the corn with 91% in the roots and 95% in the shoots (stems and leaves). MS (300 kg/ha) product alone (without NPK) also lead to an increase of K uptake, but much less than the K uptake with NPK addition as the increase was only 15% or 7% in roots and shoots, respectively. In combination with 100% (300 kg/ha) NPK the uptake of K increased with 97% and 98% in roots and shoot, respectively.

Application of MS (300 kg/ha) and 70% NPK results in a 70% increase in K uptake in roots. Application of MS (300 kg/ha) and 70% NPK results in a 74% increase in K uptake in shoots.

Figure 7:
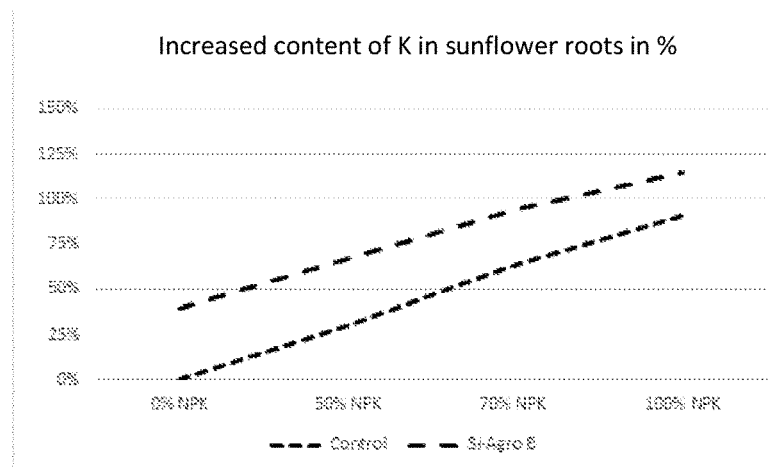
FIG. 7: Test results showing increased uptake of K in sunflower roots with application of the fertilizer according to the present invention.
Figure 8:
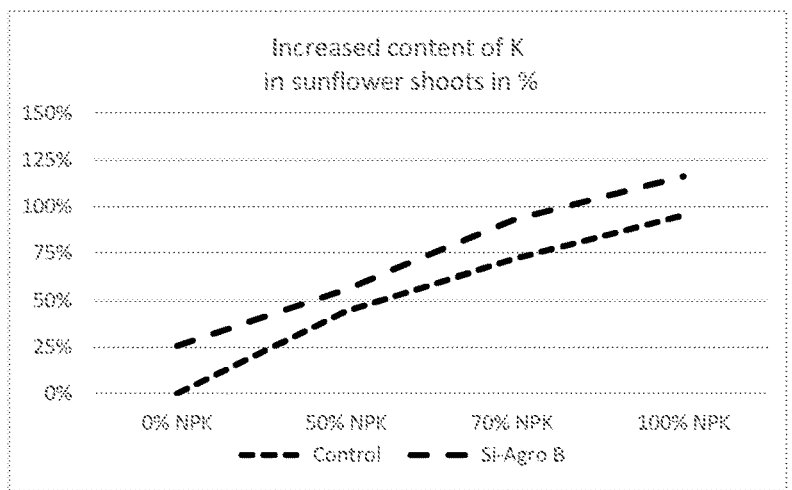
FIG. 8: Test results showing increased uptake of K in sunflower shoots with application of the fertilizer according to the present invention.
Figure 9:
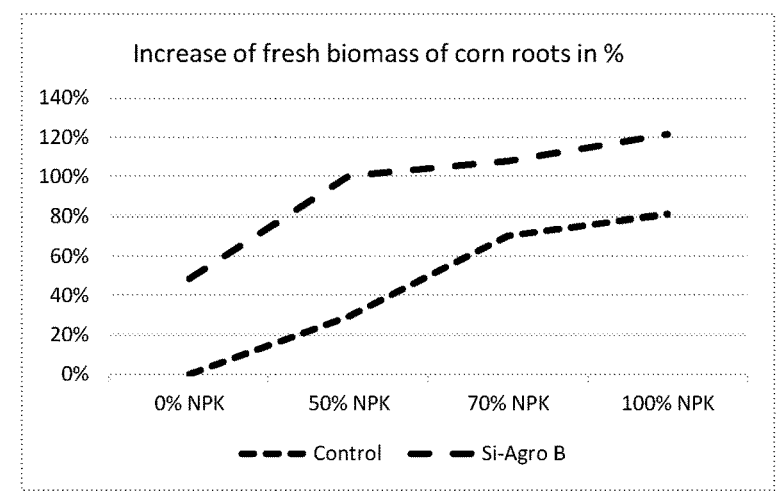
FIG. 9: Test results showing increased fresh biomass of corn roots with application of the fertilizer according to the present invention.
Figure 10:
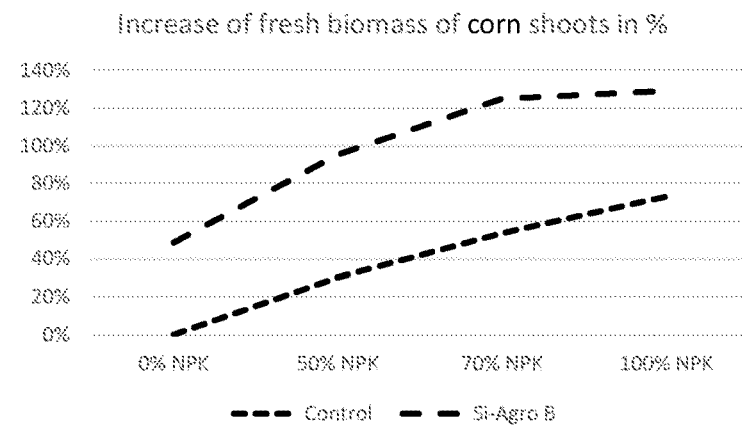
FIG. 10: Test results showing increased fresh biomass of corn shoots with application of the fertilizer according to the present invention.

Better results were seen for the sunflower where use of NPK increased the K content in the root with 91% and 95% for the stem and leaves (shoots), ref. tables 8 and 9, FIGS. 7 and 8.

TABLE 8

K uptake in sunflower roots.

| Treatment of sunflower Relative usage of NPK | mg K per kg of dry roots | | | | Increase of K in wt % | | | |
|---|---|---|---|---|---|---|---|---|
| | 0% | 50% | 70% | 100% | 0% | 50% | 70% | 100% |
| Control | 0.33 | 0.43 | 0.54 | 0.63 | 0% | 30% | 64% | 91% |
| Si Agro B (300 kg/ha MS) | 0.46 | 0.55 | 0.64 | 0.71 | 39% | 67% | 94% | 115% |

TABLE 9

K uptake in sunflower shoots.

| Treatment of sunflower Relative usage of NPK | mg K per kg of dry shoots | | | | Increase of K in wt % | | | |
|---|---|---|---|---|---|---|---|---|
| | 0% | 50% | 70% | 100% | 0% | 50% | 70% | 100% |
| Control | 0.43 | 0.62 | 0.74 | 0.84 | 0% | 44% | 72% | 95% |
| Si Agro B (300 kg/ha MS) | 0.54 | 0.67 | 0.83 | 0.93 | 26% | 56% | 93% | 116% |

MS alone (without NPK) increased the K uptake with 39% and 26% for roots and shoots respectively. MS in combination with 100% (300 kg/ha) NPK, resulted in an uptake of 115% and 116% respectively, compared to Control (0% NPK). By extrapolation of the data it seems like an amount of around 67-73% NPK in combination with 300 kg/ha of MS applied on the sunflowers, will give a similar uptake of K as when 100% of NPK is applied alone (no MS).

Using only 50% NPK together with MS will result in lower uptake of K than using NPK (100% NPK) alone. But the much higher uptake of P for a 50% reduction of NPK may compensate for the somewhat less K uptake and thereby still result in a satisfactory biomass growth. These results open for a reformulated NPK, resulting in less application of artificial fertilizers.

Example 3. Examples of Increased Biomass

Greenhouse tests for growth of corn root and shoot biomass were performed. The tests according to the present invention are denoted as "Si Agro B" in the tables below and in the accompanying drawings.

TABLE 10

Biomass of corn roots.

| Treatment of corn Biomass gram per plant Relative use of NPK: | Biomass of Roots: | | | | Increased biomass in wt % | | | |
|---|---|---|---|---|---|---|---|---|
| | 0% | 50% | 70% | 100% | 0% | 50% | 70% | 100% |
| Control | 4.54 | 5.87 | 7.73 | 8.22 | 0% | 29% | 70% | 81% |
| Si Agro B (300 kg/ha MS) | 6.74 | 9.1 | 9.44 | 10.06 | 48% | 100% | 108% | 133% |

TABLE 11

Biomass of corn shoots.

| Treatment of corn Biomass gram per plant Relative use of NPK: | Biomass of Shoots: | | | | Increased biomass in wt % | | | |
|---|---|---|---|---|---|---|---|---|
| | 0% | 50% | 70% | 100% | 0% | 50% | 70% | 100% |
| Control | 4.78 | 6.22 | 7.34 | 8.27 | 0% | 30% | 54% | 73% |
| Si Agro B (300 kg/ha MS) | 7.1 | 9.33 | 10.75 | 10.95 | 49% | 95% | 125% | 129% |

By use of NPK the root biomass increased by 81%, see table 10. Less use of NPK gave relatively less biomass. Use of MS (300 kg/ha) resulted in 48% root biomass increase, without the usage of any NPK. With use of 100% NPK together with MS the root biomass increased by 133%, about 33% more compared to usage of the NPK alone. By reducing the NPK content to 50% and 70%, replaced with MS, the increase of biomass was still 18-33 higher than for using NPK alone.

Evaluation of corn shoot (stem and leaves) biomass data gave similar results, see table 11. With 50% and 70% reduction of NPK and replaced with MS, the increase of biomass was 30% and 70% higher than for using full NPK alone.

Figure 12:
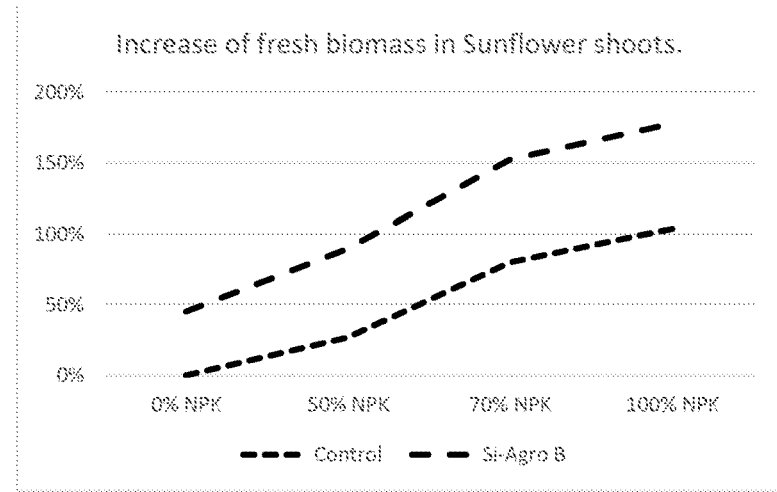
FIG. 12: Test results showing increased fresh biomass of sunflower shoots with application of the fertilizer according to the present invention.

Example for growth of sunflower gave similar results, see tables 12 and 13, and FIG. 12.

TABLE 12

Biomass of sunflower roots.

| Treatment of sunflower Biomass gram per plant Relative use of NPK: | Biomass of Roots: | | | | Increased biomass in wt % | | | |
|---|---|---|---|---|---|---|---|---|
| | 0% | 50% | 70% | 100% | 0% | 50% | 70% | 100% |
| Control | 2.28 | 3.65 | 3.78 | 4.76 | 0% | 60% | 66% | 109% |
| Si Agro B (300 kg/ha MS) | 3.09 | 5.38 | 4.92 | 5.55 | 36% | 136% | 116% | 143% |

TABLE 13

Biomass of sunflower shoots.

| Treatment of sunflower Biomass gram per plant Relative use of NPK: | Biomass of Shoots: | | | | Increased biomass in wt % | | | |
|---|---|---|---|---|---|---|---|---|
| | 0% | 50% | 70% | 100% | 0% | 50% | 70% | 100% |
| Control | 1.86 | 2.36 | 3.35 | 3.79 | 0% | 27% | 80% | 104% |
| Si Agro B (300 kg/ha MS) | 2.7 | 3.53 | 4.7 | 5.17 | 45% | 90% | 153% | 178% |

Figure 11:
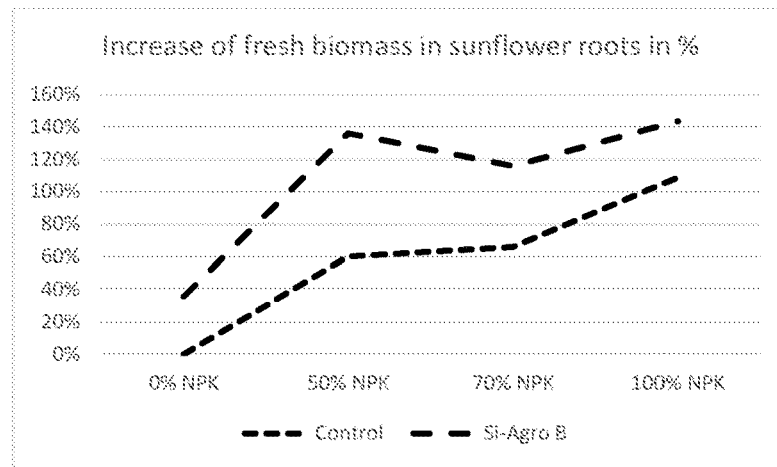
FIG. 11: Test results showing increased fresh biomass of sunflower roots with application of the fertilizer according to the present invention.

By reducing the NPK with 50% the root biomass was still about 25% higher when applied with the MS compared with using normal rate of NPK alone, see table 12 and FIG. 11. For the stem and leaves the biomass was only slightly lower (13% less) for the 50% NPK reduction when replaced with the MS compared with normal rate of biomass, but for 70% NPK the biomass was 47% higher when used with MS.

Example 4. Uptake of Nitrogen (N)

The use of MS has a strong impact on the plants uptake of Nitrogen. Nitrogen is vital because it is a major component of chlorophyll, the compound by which plants use sunlight energy to produce sugars from water and carbon dioxide (i.e. photosynthesis). It is also a major component of amino acids, the building blocks of proteins. Without proteins, plants wither and die. Some proteins act as structural units in plant cells while others act as enzymes, which is crucial for numerus biochemical reactions. Nitrogen is a component in the energy-transfer compounds, such as ATP (adenosine triphosphate). ATP allows cells to conserve and use the energy released in metabolism. Finally, nitrogen is a significant component of nucleic acids such as DNA, the genetic material that allows cells (and eventually whole plants) to grow and reproduce.

The tables below presents the uptake of Nitrogen as mg $NO_3^-$/kg dry mass of roots or leaves in apoplast and symplast of barley and pea exposed to the following treatments:
  No NPK and no MS; Control without NPK application
  300 kg/ha of NPK and no MS; Control with NPK application
  No NPK and 300 kg/ha of MS; MS without NPK application
  300 kg/ha of NPK and 300 kg/ha of MS; MS with NPK application The tests according to the present invention are denoted as "Si Agro B" in the tables below and in the accompanying drawings.

TABLE 14

Nitrogen uptake in Barley.

| | Barley | | | |
|---|---|---|---|---|
| | Apoplast (mg $NO_3^-$/ kg dry weight) | | Symplast (mg $NO_3^-$/ kg dry weight) | |
| Treatments | Roots | Leaves | Roots | Leaves |
| Without NPK application | | | | |
| Control | 2200 | 1330 | 1526 | 2920 |
| Si Agro B (300 kg/ha MS) | 2438 | 2293 | 1828 | 3360 |
| With NPK application | | | | |
| Control | 3195 | 1470 | 2560 | 4370 |
| Si Agro B (300 kg/ha MS) | 4234 | 1620 | 2725 | 4947 |

TABLE 15

Nitrogen uptake in Pea.

| | Pea | | | |
|---|---|---|---|---|
| | Apoplast (mg $NO_3^-$/ kg dry weight) | | Symplast (mg $NO_3^-$/ kg dry weight) | |
| Treatments | Roots | Leaves | Roots | Leaves |
| Without NPK application | | | | |
| Control | 695 | 1350 | 1391 | 2800 |
| Si Agro B (300 kg/ha MS) | 1334 | 2053 | 2668 | 1865 |
| With NPK application | | | | |
| Control | 979 | 1620 | 1158 | 2600 |
| Si Agro B (300 kg/ha MS) | 1368 | 1993 | 1907 | 3706 |

Application of MS to Barley resulted in an 11 and 72% increase of $NO_3^-$ content in the apoplast (roots and leaves), and a 20 and 15% of $NO_3^-$ content in symplast. With application of 300 kg/ha of NPK and no MS to the Barley, the content of $NO_3^-$ in apoplast and symplast were both less and more compared to when MS was applied alone without NPK. Combined application of NPK and MS, resulted in an increase of around 6-33% in $NO_3^-$ content in both apoplast and symplast (roots and leaves), see table 14.

Much better observations were made for the same treatments conducted on Pea, see table 15, where an increase in the range of 20-84% was found when NPK and MS was applied together. This proved that with application of MS, the amount of NPK can be reduced, while the amount of $NO_3^-$ taken up by the plant remains the same as not using MS.

Example 5. Rice Field Trials with Si-Agro B in Hunan, China

A fertilizers according to the present invention was tested in full scale field trials in China by Hunan Institute of Economic Geography, using 3 different field locations (Xiangtan; Zhuzhou, Xiangyin). The field tests were executed during $2^{nd}$ season (autumn season) of 2017. The test was benchmarked against use of normal dosage of NPK (referred to as 100%), against use of 70% of normal dosage of NPK and the test with the fertilizer according to the present invention, used microsilica together with 70% NPK. Normal dosage of NPK was: N (urea)=150 kg N/ha, P (superphosphate)=135 kg P/ha and K (KCl)=135 kg K/ha) one day before seedling, and added with 30 kg N/ha one week after seedling. The amount of microsilica in the Si Agro B tests was 1000 kg/ha. In this test the relative amount of Si fertilizer was high, as there was a desire to bind Cd in soil, thus reducing the uptake of Cd in the rice grains.

Following results for the rice grain yields (in kg/ha) for the three test fields are seen in table 16. Yield for normal use of NPK is set to 100% and the other yield data compared accordingly in %.

TABLE 16

The result of yield of rice grains

| Field | Xiangtan | Zhuzhou | Xiarigyin | Average |
|---|---|---|---|---|
| 100% NPK | 100% | 100% | 100% | 100% |
| 70% NPK | 92.50% | 76.10% | 85.10% | 84.57% |
| 70% NPK + MS (Si Agro B) | 100.90% | 104.90% | 99.00% | 101.60% |

As demonstrated, by reducing use of NPK with 30%, together with addition of microsilica the yield can be maintained at same level as using normal dosage of NPK.

A purpose for these field tests was to reduce uptake of heavy metal, especially Cadmium. Results are shown below in table 17.

TABLE 17

Uptake of Cd in rice grains in % compared to normal usage of NPK.

| Field | Xiangtan | Zhuzhou | Xiarigyin | Average |
|---|---|---|---|---|
| 100% NPK | 100% | 100% | 100% | 100% |
| 70% NPK | 83.00% | 59.00% | 108.00% | 83.33% |
| 70% NPK + MS (Si Agro B) | 20.00% | 57.00% | 47.00% | 41.33% |

As demonstrated, by reducing use of NPK with 30%, together with addition of amorphous silicon dioxide, the uptake of cadmium is reduced with about 60%. In one field example it was reduced with 80%.

Having described preferred embodiments of the invention it will be apparent to those skilled in the art that other embodiments incorporating the concepts may be used. These and other examples of the invention illustrated above are intended by way of example only and the actual scope of the invention is to be determined from the claims.

The invention claimed is:

1. A combined NPK-Si fertilizer product consisting of
   a mineral NPK fertilizer, which comprises nitrogen, phosphorous and potassium, and
   a particulate amorphous silicon dioxide,
   wherein the ratio of the mineral NPK fertilizer to the amorphous silicon dioxide is from 10:90 to 90:10, based on the dry weight of the nitrogen, phosphorous, and potassium, and the amorphous silicon dioxide contained in the product, and
   optionally one or more secondary nutrients, one or more micro nutrients, and/or one or more fillers.

2. The combined NPK-Si fertilizer product according to claim 1, wherein the mineral NPK fertilizer contains:
   (a) nitrogen (N), in the form of nitrate ($NO_3^-$), ammonium ($NH_4^+$) and/or urea ($CO(NH_2)_2$),
   (b) phosphorous (P), in the form of phosphate ($PO_4^{3-}$), hydrogen phosphate ($HPO_4^{2-}$) and/or dihydrogen phosphate ($H_2PO_4^-$), and
   (c) potassium (K), in the form of potassium salt ($K^+$).

3. The combined NPK-Si fertilizer product according to claim 1, wherein the particulate amorphous silicon dioxide is microsilica (silica fume) and/or rice husk ash.

4. The combined NPK-Si fertilizer product according to claim 1, wherein the particulate amorphous silicon dioxide is in the form of agglomerated particles, micropellets, pellets or granules.

5. The combined NPK-Si fertilizer product according to claim 1, wherein the ratio of the mineral NPK fertilizer to the amorphous silicon dioxide ranges from 20:80 to 80:20, based on the dry weight of nitrogen, phosphorous and potassium, and the amorphous silicon dioxide contained in the product.

6. The combined NPK-Si fertilizer product according to claim 1, wherein the NPK fertilizer contains nutrient compounds of
   N, P and K;
   N and P;
   P and K; and/or
   N and K; and/or
   in the form of single nutrient fertilizer containing compounds of N, P and/or K,
   in addition to the said particulate amorphous silicon dioxide.

7. The combined NPK-Si fertilizer product according to claim 1, wherein the NPK-Si fertilizer is in the form of granules, prills, extrudates, pellets or agglomerates.

8. The combined NPK-Si fertilizer product according to claim 1, wherein the content of nitrogen nutrient in the NPK fertilizer is up to about 46 weight-% in terms of elemental N.

9. The combined NPK-Si fertilizer product according to claim 1, wherein the content of phosphorous nutrient in the NPK fertilizer is up to weight-55% in terms of $P_2O_5$.

10. The combined NPK-Si fertilizer product according to claim 1, wherein the contents of potassium nutrient in the NPK fertilizer is up to weight-62% in terms of $K_2O$.

11. The combined NPK-Si fertilizer product according to claim 1, wherein the optional secondary nutrients are selected from the group consisting of: calcium (Ca), sulphur (S) and magnesium (Mg), and wherein the optional micronutrients are selected from the group consisting of: zinc (Zn), copper (Cu), iron (Fe), boron (B) and molybdenum (Mo).

12. The combined NPK-Si fertilizer product according to claim 1, wherein the NPK-Si fertilizer product is in the form of a physical mixture or a blend of at least one particulate mineral NPK fertilizer compound and the particulate amorphous silicon dioxide.

13. The combined NPK-Si fertilizer product according to claim 1, wherein the amorphous silicon dioxide is in the form of inclusions in at least one particulate NPK fertilizer or on a surface of at least one particulate NPK fertilizer.

14. The combined NPK-Si fertilizer product according to claim 1, wherein the mineral NPK fertilizer is in the form of a compound fertilizer containing nutrient compounds of N, P and K.

15. The combined NPK-Si fertilizer product according to claim 1, wherein the NPK-Si fertilizer is in the form of a compound fertilizer containing compounds of N, P and/or K and the particulate amorphous silicon dioxide.

16. A method for the production of the combined NPK-Si fertilizer product of claim 1, comprising:
   (i) adding particulate amorphous silicon dioxide in a liquid stage of the NPK production process forming a slurry, the said liquid stage is subsequent to any acid digestion step of the NPK production process, followed by granulating or prilling; or (ii) adding particulate amorphous silicon dioxide subsequent a liquid stage of the NPK production process and during an agglomeration process of the production of the mineral NPK fertilizer; or (iii) dry-mixing at least one preformed particulate NPK fertilizer with a particulate amorphous silicon dioxide, thereby forming a mechanical blend, wherein the particulate amorphous silicon dioxide is added in an amount to obtain the ratio of mineral NPK fertilizer to the amorphous silicon dioxide of from 10:90 to 90:10 based on the dry weight of the nitrogen, phosphorous and potassium, and the amorphous silicon dioxide contained in the product, thereby producing the combined NPK-Si fertilizer product consisting of a mineral NPK fertilizer, which comprises nitrogen, phosphorous and potassium, and a particulate amorphous silicon dioxide, wherein the ratio of the mineral NPK fertilizer to the amorphous silicon dioxide is from 10:90 to 90:10, based on the dry weight of the nitrogen, phosphorous, and potassium, and the amorphous silicon dioxide contained in the product, and optionally one or more secondary nutrients, one or more micro nutrients, and/or one or more fillers.

17. The method according to claim 16, wherein in (ii) the particulate amorphous silicon dioxide is in the form of a slurry or dispersion.

18. The method according to claim 17, wherein the slurry or dispersion is sprayed, or sprinkled during a granulation or prilling process.

19. The method according to claim 16, wherein the mineral NPK fertilizer contains at least one of the following nutrient compounds:

(a) nitrogen (N), in the form of a nitrate ($NO_3^-$), an ammonium ($NH_4^+$) and/or urea ($CO(NH_2)_2$), (b) phosphorous (P), in the form of a phosphate ($PO_4^{3-}$), hydrogen phosphate ($HPO_4^{2-}$) and/or a dihydrogen phosphate ($H_2PO_4^-$), and (c) potassium (K), in the form of a potassium salt ($K^+$).

20. The method according to claim 16, wherein the particulate amorphous silicon dioxide is microsilica (silica fume) and/or rice husk ash.

21. The method according to claim 20, wherein the particulate amorphous silicon dioxide is in the form of agglomerated particles, micropellets, pellets or granules.

22. The method according to claim 16, wherein the ratio of the mineral NPK fertilizer to the amorphous silicon dioxide is selected from the group consisting of the following ranges from 20:80 to 80:20, from 30:70 to 70:30, from 40:60 to 60:40 and 50:50, based on the dry weight of the nitrogen, phosphorous and potassium, and the amorphous silicon dioxide contained in the product.

23. A method for supplying nutrients and/or soil conditioners to agricultural or greenhouse soil, comprising applying the combined NPK-Si fertilizer product according to claim 1 to the agricultural or greenhouse soil.

24. The method for supplying nutrients and/or soil conditioners to agricultural or greenhouse soil, comprising applying the combined NPK-Si fertilizer according to claim 1 to the agricultural or greenhouse soil, wherein the mineral NPK fertilizer, and the particulate amorphous silicon dioxide, are applied as separate constituents.

* * * * *